United States Patent [19]

Powell et al.

[11] Patent Number: 4,611,039

[45] Date of Patent: Sep. 9, 1986

[54] WETTABLE, GAS PERMEABLE CONTACT LENS

[75] Inventors: James C. Powell, Minnetonka, Minn.; G. Graham Allan, Seattle, Wash.

[73] Assignee: Precision-Cosmet Co., Inc., Minnetonka, Minn.

[21] Appl. No.: 319,193

[22] Filed: Nov. 9, 1981

[51] Int. Cl.[4] .................. C08F 212/06; C08F 212/08; G02C 7/04

[52] U.S. Cl. ..................... 526/271; 264/1.7; 264/2.4; 264/2.7; 351/160 H; 351/160 R; 525/329.1; 526/263; 526/272; 526/279; 526/320; 526/347.1

[58] Field of Search ............... 526/272, 271; 351/160 H, 160 R; 525/329, 328

[56] References Cited

U.S. PATENT DOCUMENTS

| | | | |
|---|---|---|---|
| 2,361,019 | 10/1944 | Gerhart | 526/272 |
| 3,221,083 | 11/1965 | Crandon | 264/1 |
| 3,808,178 | 4/1974 | Gaylord | 260/86.1 E |
| 4,093,361 | 6/1978 | Erickson et al. | 351/160 |
| 4,228,269 | 10/1980 | Loshack et al. | 526/346 |
| 4,243,790 | 1/1981 | Foley, Jr. | 526/320 |
| 4,335,037 | 6/1982 | Lordi et al. | 524/504 |

FOREIGN PATENT DOCUMENTS

| | | |
|---|---|---|
| 1395501 | 5/1975 | United Kingdom . |
| 1436705 | 5/1976 | United Kingdom . |
| 1478455 | 6/1977 | United Kingdom . |

*Primary Examiner*—Stanford M. Levin
*Attorney, Agent, or Firm*—Merchant, Gould, Smith, Edell, Welter & Schmidt

[57] ABSTRACT

Wettable, oxygen and carbon dioxide permeable, optically clear contact lenses are made of a composition comprising styrene or a substituted styrene compound, an ethylenically polyunsaturated crosslinking compound and an ethylenically unsaturated silicone containing compound and an $\alpha,\beta$-unsaturated dicarboxylic acid anhydride compound.

33 Claims, No Drawings

WETTABLE, GAS PERMEABLE CONTACT LENS

FIELD OF THE INVENTION

This invention relates to hard contact lenses suitable for extended wear.

BACKGROUND OF THE INVENTION

Individuals who require vision correction are presented with a choice between wearing glasses, i.e. corrective lenses mounted in frames, or contact lenses placed directly in intimate contact with the cornea on the surface of the eye. While glasses are successful in correcting many vision problems, they are easily damaged, require repeated cleaning, tend to change the appearance of the wearer and are somewhat heavy and uncomfortable. Contact lenses have minimal mass and size, are easy to use, do not substantially change the user's appearance, and can correct vision problems without reducing field of vision.

Both hard and soft contact lenses are available. Hard lenses are rigid or semi-rigid and are commonly made from methyl methacrylate polymers which are optically excellent and easily machined and molded. Soft lenses are made from hydrophilic polymeric compositions, for example a hydroxyalkylmethacrylate polymer. After soaking in an aqueous medium, soft lenses are flexible and readily conform to the shape and contour of the corneal surface of the eye. Soft contact lenses are somewhat more expensive than hard lenses, and require somewhat more care.

The corneal surface of the eye comprises epithelial cells that respire by obtaining oxygen by diffusion from tear fluid and by diffusing carbon dioxide from the cell into the tear fluid. Oxygen is required by the cells in energy producing metabolism and carbon dioxide is a major waste product of metabolism. Many contact lens materials are substantially impermeable to the exchange of oxygen and carbon dioxide between tear fluid and the corneal epithelial cells. Further, the intimate contact and position of the lens substantially prevents tear fluid from circulating over the epithelial cells covered by the lens. As a result corneal epithelial cells covered by a contact lens can become starved for oxygen and the concentration of carbon dioxide can build up inside the cell, causing corneal edema and often extreme discomfort. In the absence of means to provide oxygen and carbon dioxide exchange between the corneal epithelium and tear fluid, the user must restrict the use of the lenses to comparatively short periods.

In the past many design modifications and many different materials have been tried to increase flow of tear fluid and reduce oxygen starvation. Lenses have been designed with small channels under the lens which permitted the flow of fluid. The selection of compositions for contact lens manufacture should be made with the following characteristics in mind. The lenses must be optically clear, easily machined and molded, highly permeable to the exchange of oxygen and carbon dioxide between tear fluid and the corneal epithelium, dimensionally and mechanically stable, water wettable to avoid eye irritation, and biochemically inert to avoid eye inflammation.

Soft lenses, made from hydroxy alkyl methacrylate polymers, that permit sufficient oxygen and carbon dioxide exchange, tend to be fragile, can be easily contaminated by bacteria, and are of a size that is too large for users who prefer or require ultrathin lenses.

Recently optically clear lenses, permeable to exchange of oxygen and carbon dioxide, have been made from polymers comprising styrene or alkyl substituted styrene wherein the alkyl group can be on the vinyl portion of the styrene molecule or on the aromatic portion. See U.S. Pat. Nos. 4,243,790; 4,228,269 and U.K. Pat. Nos. 1,395,501; 1,436,705; and 1,478,455. We have found that these lens materials tend to be hydrophobic and can cause eye and eyelid irritation since tears cannot wet the lens. A lens which cannot be wetted tends to be somewhat abrasive to the eye and lid, causing wearer discomfort. Hydrophilic monomers can be added during polymerization of the lens material, however well known hydrophilic monomers such as N-vinyl pyrollidone and others can reduce the mechanical and dimensional stability of the lens.

Accordingly, a substantial need exists for a material for hard contact lenses which is optically clear, dimensionally stable, permeable to oxygen and carbon dioxide exchange between the corneal epithelium and tears, wettable by tears, and substantially non-abrasive and non-irritating to the eye and lid.

We have found a contact lens material, which combines the properties of oxygen and carbon dioxide exchange permeability, wettability, dimensional and mechanical stability with optical clarity, which comprises:

(a) styrene, a substituted styrene compound or mixtures thereof, (b) an ethylenically polyunsaturated crosslinking compound, (c) an ethylenically unsaturated silicone containing compound, and (d) an $\alpha,\beta$-ethylenically unsaturated dicarboxylic acid anhydride compound.

DETAILED DESCRIPTION

While I do not wish to be limited to one theory regarding the improved properties of the material, the silicone containing compounds appear to disrupt the close-packing or semi-crystalline nature of the polystyrene compound. The disrupted material has increased permeability to oxygen and carbon dioxide exchange and surprisingly, in view of the nature of silicone compounds, is wettable.

Styrene Monomer

The contact lens material of this invention can comprise styrene or a substituted styrene or mixtures thereof having the formula:

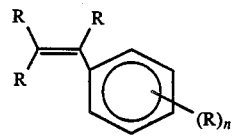

wherein n is an integer of 1–5, and each R is independently selected from hydrogen, and n-alkyl, n-alkoxy, i-alkyl, i-alkoxyl, t-alkyl or t-alkoxy groups having 1–8 carbon atoms, and of the three vinyl substituents at least two are hydrogen. Examples of suitable alkyl groups include methyl, methoxy, ethyl, i-propyl, i-propoxyl, t-butyl, t-butoxy, i-amyl, n-hexyl, cyclohexyl, n-octyl, 2-ethyl-hexyl, etc. Examples of suitable styrene compounds include styrene, α-methyl-styrene (1,1-methylphenyl ethylene), p-methyl-styrene, (4-methyl-1-vinyl-benzene), 1,1-ethyl-(4-(2-ethyl)-hexyl)phenyl-ethylene, 1,1-t-hexyl-(3-i-amyl)phenyl ethylene, etc.

Preferred monomers include compounds having the formula:

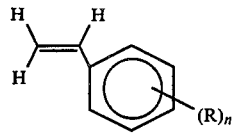

wherein n is an integer of 1–5 and R is a branched chain alkyl group having 3–6 carbon atoms. Examples of useful compounds include 1-vinyl-4-t-butoxy-benzene, 1-vinyl-3-i-propoxy-benzene, 1-vinyl-3-methoxy-benzene, 1-vinyl-4-i-amyl-benzene, 1-vinyl-(3-(2-ethyl)-hexyl)-benzene, 1 vinyl-2,4-di-i-hexyl benzene, 1-vinyl-5,6-diethyl hexyl benzene, 1-vinyl-i-propyl-benzene (i-propyl styrene), 1-vinyl-t-butyl-benzene (t-butyl styrene), etc. or mixtures thereof. An i-propyl styrene, an i-propoxy styrene, t-butyl styrene, or t-butoxy styrene can have the substituent group on the aromatic ring at the 2,3, or 4 position, most preferably at the 3 or 4 position.

Ethylenically Unsaturated Silicone-Containing Compound

The contact lens material of this invention also comprises an ethylenically unsaturated silicone containing compound comprising at least one ethylenically unsaturated group and at least one silicone group. These silicone-containing monomers in combination with the styrene monomers provide substantial oxygen and carbon dioxide exchange permeability to the lens material to prevent oxygen starvation in the corneal epithelium. Useful silicone groups include those represented by the formula:

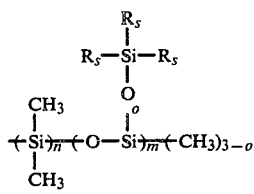

wherein m, n and o are independently integers of 0 to 10, $m+n+o \geq 1$ and $R_s$ is

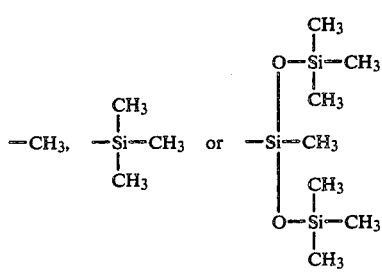

Preferred silicone groups include

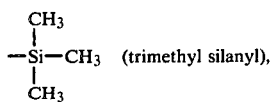 (trimethyl silanyl),

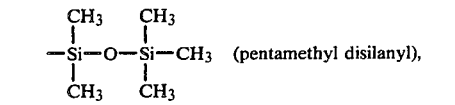 (pentamethyl disilanyl),

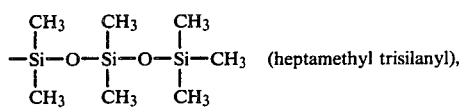 (heptamethyl trisilanyl),

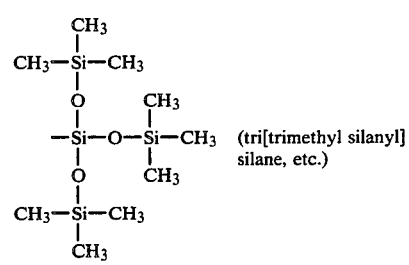 (tri[trimethyl silanyl] silane, etc.)

Important characteristics of the unsaturated group is that it is attached to the silicone group through a —O— bond or directly bonded to a silicone atom. The unsaturated group can be copolymerizable with the styrenic compounds and the crosslinking compounds, and can comprise vinyl, vinyl phenyl, acryl, methacryl, hex-5-enyl, etc. General examples of useful compounds include various acrylate and methacrylate silicone compounds, vinyl phenyl silicone compounds, vinyl silicone, n-alkenyl silicone compounds, etc. and mixtures thereof.

Preferred silicone monomers include methacryloxypropylpentamethyl disiloxane, and pentamethyl-disiloxyanylmethacrylate, which can beneficially be used in combination with about 0.01 to 2 parts of an alkyl acrylate or an alkyl methacrylate, including methyl acrylate or methyl methacrylate per part of the ethylenically unsaturated silicone containing compound, to make permeable optically clear lens material. Monomers such as pentamethyl disiloxanyl methacrylate containing silicon groups attached via the oxygen linkage are easily hydrolyzed to the silanol and the corresponding acid. These types of linkages have been avoided in the contact lens industry because of this instability. However when used in rigid contact lens material of very low water content this hydrolysis occurs only on the surface which promotes wettability and does not give unstable material which has been the current theory.

Crosslinking Agent

The styrene monomer, and the silicone containing monomer in combination with an ethylenically crosslinking polyunsaturated agent comprising at least two ethylenically unsaturated groups attached to a polyvalent group provides the contact lens material with hardness, and mechanical-dimensional stability.

Crosslinking agents that can be used include a wide variety of commonly known ethylenically poly (di, tri-, etc.) unsaturated crosslinking agents including the following:

(1) vinyl acrylate and methacrylate,
(2) allyl acrylate and methacrylate, (3) diacrylates and dimethacrylates of polyoxyethylene, polyoxypropylene and polyoxybutylene glycols, (4) triacrylate and trimethacrylate of glycerol and propylene glycol, (5) trivinylcyanurate, (6) olefin glycol dimethacrylates, (7) allyl digylcol carbonate, (8) triallylcyanurate (9) diallyl carbonates and polyallyl carbonates of dihydroxy or polyhydroxy compounds,

(10) divinyl and polyvinyl carbonates of dihydroxy or polyhydroxy compounds,

(11) di- or triacrylates and methacrylates of a polyhydroxy compound such as trihydroxy propane or trimethylol propane,

(12) di-, tri or polyvinyl ester of di-, tri- or polycarboxylic acids,

(13) di-, tri- or polyvinyl ethers of di-, tri- or polyhydroxy compounds,

(14) di-, tri- or polyallyl ethers of di-, tri- or polyhydroxy compounds;

(15) di-, tri- or polyallyl esters of di-, tri- or polycarboxylic compounds,

(16) di-, tri- or tetravinyl aromatic compounds.

The preferred crosslinking agent comprises 1,1,1-trimethylolpropane trimethacrylate.

DICARBOXYLIC ACID COMPOUNDS

An $\alpha,\beta$-ethylenically unsaturated dicarboxylic acid anhydride in combination with the other monomers provides wettability substantially preventing eye and lid irritation. Examples of the dicarboxylic anhydride include maleic anhydride, citraconic anhydride, ethyl maleic anhydride, itaconic anhydride, halo-maleic anhydride, etc. Preferably maleic anhydride is used for reasons of reactivity and increased wettability of the resulting polymer. Significantly improved wettability can be achieved by hydrolyzing the $\alpha,\beta$-unsaturated dicarboxylic acid anhydride polymeric units, after the plastic has been made and the contact lens formed. The resulting finished lens can be exposed to a basic solution (e.g. a sodium or ammonium hydroxide solution of about 1 to 10% by weight) to hydrolyze the maleic anhydride segments of the polymer at the surface of the lens, making hydrophilic carboxylic acid units.

In order to provide other properties to the lens material, coloring agents, ultraviolet light absorbers, light polarizers, etc. can be either chemically included in the polymer chain or can be dispersed through the polymeric matrix.

MANUFACTURE OF LENS MATERIAL

In somewhat greater detail the contact lens composition can be made by polymerizing the stryene monomer, the silicone monomer, the crosslinking agent and the $\alpha,\beta$-unsaturated dicarboxylic acid compound in the presence of a polymerization catalyst. Commonly the monomers can be combined in a polymerization reaction mixture comprising about 50-80 parts, preferably 50-60 parts of styrene or the substituted styrene compound, about 5 to 20 parts, preferably 8-16 parts of the ethylenically polyunsaturated crosslinking compound, about 4 to 10 parts, preferably 4-7 parts of the ethylenically unsaturated silicone containing compound and about 4-15, preferably 4-10 parts of the $\alpha,\beta$-ethylenically unsaturated dicarboxylic acid anhydride compound.

The preferred catalysts for use herein are 2,2-diethoxyacetophenone, which generates free radicals upon exposure to ultraviolet radiation and 2,2-azobis-(2-methylbutyronitrile), which generates free radicals upon heating. While azobisisobutyronitrile can be used as a polymerization initiator it can generate toxic species in the polymer. Many other catalysts which induce polymerization and crosslinking may be used with varying degrees of success. For example, various organic peroxides may be used including benzoyl expoxide, chlorobenzoyl peroxide, tertiary butyl peroxy carbonate, lauroyl peroxide and many other peroxides that are soluble in the monomer system can be used.

The catalyst can be used at about 1% of the reaction mixture. The preferred technique is to mix the desired monomers, dispense them into clear molded or machined cups and then expose the cups to heat or ultraviolet radiation depending upon the free radical polymerization initiator used. It is always advisable to give the cups a degassing step and subsequent flushing with nitrogen prior to polymerization.

The conditions for polymerization are not critical. Ambient pressures and temperatures can be satisfactory for polymerization with ultraviolet radiation. Times of about from 1 to 12 hours can be sufficient at a radiation level of about from 750 to 3000 microwatts per square centimeter. Where heat is used to initiate the production of free radicals a temperature of about ambient (20° C.) to 95° C. can be sufficient to ensure polymerization. Times of about from 24 to 48 hours are satisfactory. Curing of the polymerized mass at about ambient (20° C.) to 90° C. for about 8 to 20 hours can be effective.

MANUFACTURE OF LENSES

In order to manufacture the lenses the resulting rigid solid product can be cut or formed into approximately circular lens blanks of the appropriate dimensions of about ¾ to 1 inch in diameter and about ⅝ to 1 inch in thickness (about 19 to 25 mm in diameter and about 15 to 25 mm in thickness) and the lens blanks can be ground to the desired surface finish. After grinding the surface $\alpha,\beta$-unsaturated dicarboxylic anhydride polymer groups can be hydrolyzed to free carboxylic acid, which are hydrophilic, with a basic solution, for example, a 1-15 weight-% solution of ammonium hydroxide or preferably sodium hydroxide to attain maximum wettability.

Although the lens can be advantageously used as a hard plastic lens by fabrication in the manner indicated above, it is sometimes desirable to provide a composite type lens in which the peripheral skirt area of the lens comprises a hydrophilic copolymer formed from a water soluble vinyl monomer copolymerized with a hydrophilic water insoluble monomer in the presence of a crosslinking agent and a quantity of a water soluble inert substance. This inert substance is substantially removable by exposure of the polymer to water. Upon exposure to water, a substantial portion of the water soluble inert substance is removed from the polymer matrix and replaced by water to form the soft hydrophilic polymer structure desirable for use in contact lenses. Stresses and distortions of the lens can be minimized or eliminated by simply exchanging the water soluble inert substance for water in the polymer matrix. See U.S. Pat. No. 4,093,361.

One method of forming this type of composite contact lens is to polymerize a rod-like member comprising the lens composition of this invention, having a diameter of the center section of about 6 to 7 millimeters. A compatible polymer system which will form a hydrophilic polymerized outer cylindrical portion having a lower degree of hardness can then be polymerized about the outside of the rod-like member. A suitable water soluble inert substance which will not interfere with the polymerization is dissolved throughout the matrix of the polymerization system used to form the outer portion of the rod.

Another method of forming the contact lens of this invention is to polymerize a rod of a size equal to the outside diameter of the lens, e.g. 10-15 mm, the polymerization mixture containing a water soluble inert substance. In a hole drilled at the center of this rod of the size equal to the center of the lens is polymerized the hard copolymeric material described above, which is compatible with the outer material. The resuting composite rod has a coaxial cylindrical configuration with the outer layer having properties differing from the center core. If a graduation of properties is desired the process may be repeated as many times as desired, each successive drilling and filling operation using successively smaller diameter drills.

In the fabrication of the composite rod-like blank discussed above one can incorporate one or more markers for identifying the finished lenses. For example, it is common practice to mark one of the two lenses manufactured for a patient so that the patient may identify the proper lens for the right or left eye. By incorporating a strand or small rod of colored or opaque material in the outer peripheral portion of the composite rod or in any other suitable location all lenses cut from the blank so marked would carry the identifying indicia. The rod or strand may be of any material compatible with the polymer system used. For example, a small carbon rod, a polymerized thread such as dacron or nylon or any rod made of a colored plastic resin may be used so long as it does not dissolve nor interfere with the polymerization of the monomers used and so long as it will readily grind and polish along with the rest of the composite rod material into a contact lens shape.

The invention will be further understood by reference to the following Examples that include a preferred embodiment. In the Examples oxygen gas permeability values ($D_K$), in units of $ml(O_2)\text{-}cm^2/sec\text{-}ml\text{-}mm\ Hg$, are measured at 37° C. in an oxygen-consuming electrode cell (oxygen flux meter). See J. Falt, *Polarographic Oxygen Sensor*, CPC Press (1976). Values of $D_K$ greater than $12 \times 10^{-11}$, preferably greater than $20 \times 10^{-11}$ are desired for contact lens material that are permeable to exchange of oxygen and carbon dioxide between corneal epithelium and tears.

Water wettability can be determined on dry samples using a Kayness contact angle instrument. Contact angles of less than 75° and preferably less than 70° indicate beneficial wettability.

Mechanical stability can be determined using measurements of base curvature on American Optical Radius Scope. A change in base curvation of less than 0.04 mm is acceptable.

EXAMPLE I

A polymerization reaction mixture was prepared on a weight basis comprising a tertiary butyl styrene (1-vinyl-4-t-butyl-benzene)—39.6%; methylmethacrylate—39.6%; hydroxyethylmethacrylate—9.9%; 1,4-divinylbenzene—9.9%; and diethoxyacetophenone—1.0%. The reaction mixture was stirred for five minutes, dispensed into transparent acrylic cups molded from a UV transmitting grade of polymethacrylate resin, placed on a glass tray above a bank of ultraviolet fluorescent tubes and exposed to UV light at an intensity of at least 1500 microwatts per square centimeter for about twelve hours.

Lenses were manufactured by grinding and polishing the blanks formed above from the resulting polymer. The lenses had very good stability even to boiling water, however the material had a permeability ($D_K$ constant) of $1 \times 10^{-11}$.

EXAMPLE II

The procedure of Example I was repeated except that the following reaction mixture was used instead of the reaction mixture of Example I: tertiary butyl styrene—83.0%; pentamethyl disiloxanyl methacrylate—20.8%; 1,4-divinylbenzene—3.6%; hydroxyethylmethacrylate—0.8%; diethoxyacetophenone—0.5%.

The resulting lenses were very stable, but had a permeability ($D_K$ constant) of $1.8 \times 10^{-11}$.

EXAMPLE III

The procedure of Example I was repeated except that the following reaction mixture was used in place of the reaction mixture of Example I: tertiary butyl styrene—74.3%; pentamethyl disiloxanyl methacrylate—20.8%; 1,4-divinylbenzene—3.6%; hydroxyethylmethacrylate—0.8%; diethoxyacetophenone—0.5%.

The resulting lenses were very stable and had a permeability of $5 \times 10^{-11}$.

EXAMPLE IV

The procedure of Example I was repeated except that the following reaction mixture was used in place of the reaction mixture of Example I: tertiary butyl styrene—84.13%; methylmethacrylate—6.0%; pentamethyl disiloxanyl methacrylate—6.0%; divinylbenzene—3.0%; hydroxyethylmethacrylate—0.78%; and diethoxyacetophenone—0.06%.

The resulting lenses were very stable and had a permeability constant of $10 \times 10^{-11}$. The mixture was not wettable by human tears.

EXAMPLE V

The procedure of Example I was repeated except that the following reaction mixture was used in place of the reaction mixture of Example I: tertiary butyl styrene—40.0%; pentamethyl disiloxanyl methacrylate—9.0%; methylmethacrylate—36.0%; divinylbenzene—4.5%; hydroxyethylmethyacrylate—9.5%; diethoxyacetophenone—1.0%.

The resulting lenses were very stable and had a permeability constant of $2.5 \times 10^{-11}$. In spite of the high loading of HEMA to increase hydrophilicity, the material was still not wettable by human tears.

EXAMPLE VI

The procedure of Example I was repeated except that the following reaction mixture was used in place of the reaction mixture of Example I: tertiary butyl styrene—46.0%; 4-methyl pentene—27.6%; methylmethacrylate—11.0%; hydroxyethylmethacrylate—9.2%; 1,4-divinylbenzene—3.7%; diethoxyacetophenone—2.3%.

The resulting lenses were stable but only had a permeability of $5.0 \times 10^{-11}$.

EXAMPLE VII

The procedure of Example I was repeated except that the following reaction mixture was used in place of the reaction mixture of Example I: tertiary butyl styrene—80.7%; pentamethyl disiloxanyl methacrylate—5.8%; methylmethacrylate—5.8%; divinylbenzene—5.8%; hydroxyethylmethacrylate—1.4%; diethoxyacetophenone—0.5%.

The resulting polymer was stable and had a permeability of $4.5 \times 10^{-11}$, but was not wettable by human tears.

EXAMPLE VIII

The procedure of Example I was repeated with the following reaction mixture: tertiary butyl styrene—70.75%; pentamethyl disiloxanyl methacrylate—5.5%; methylmethacrylate—5.5%; trimethylolpropane trimethacrylate—11.0%; maleic anhydride—7.15%; diethoxyacetophenone—0.1%. The resulting polymer was very stable upon hydration, had a permeability factor of $15 \times 10^{-11}$, and when the resulting lenses had been soaked in 2% aqueous NaOH solution for 72 hours, had very good wettability by human tears and a saline content angle of 66°.

EXAMPLE IX

The procedure of Example 1 was repeated with the following reaction mixture: tertiary butyl styrene—74.9%; pentamethyl disiloxanyl methacrylate—5.8%; trimethylolpropane trimethacrylate—11.6%; maleic anhydride—7.6%; diethoxyacetophenone—0.1%. The polymer had a $D_K$ of $15 \times 10^{-11}$ and was wettable.

EXAMPLE X

Tertiary butyl styrene 99.85% and azobisisobutyronitrile 0.15% were mixed thoroughly and placed in sealed glass vials. The vials were heated in a water bath at 50° C. for five days then placed in a forced draft oven at 70° C. for four hours and then at 110° C. for 18 hours. This material had an oxygen permeability factor of $20 \times 10^{-11}$. However, lenses manufactured from the material had a cloudy appearance after hydration and were not wettable by human tears.

EXAMPLE XI

Example IX was repeated except that the following reaction mixture was used in place of the reaction mixture of Example IX: tertiary butyl styrene—94.85%; ethylene glycol dimethacrylate—5.0%; azobisisobutyronitrile—0.15%. The resulting material had a permeability factor of $16 \times 10^{-11}$, and lenses manufactured from this material had variable power and a cloudy appearance after hydration.

EXAMPLE XII

Example IX was repeated excedpt that the following reaction mixture was used in place of the reaction mixture of Example IX: tertiary butyl styrene—79.5%; N-vinylpyrrolidone—19.75% and azobisisobutyronitrile—0.15%. The resulting material had a permeability constant of $14 \times 10^{-11}$, was cloudy upon hydration and all of the lenses flattened unacceptably.

EXAMPLE XIII

Example XI was repeated, except the vinyl pyrrolidone content is reduced from 19.75% by 1% and 1% of ethylene glycol dimethacrylate was added. The resulting polymer had a permeability ($D_k/L$) factor of $12 \times 10^{-11}$ and lenses produced from the material had a cloudy film and flattened excessively upon hydration.

EXAMPLE XIV

Example VIII was repeated without maleic anhydride and the lenses made from the material were essentially nonwettable.

The foregoing description and Examples are exemplary of the invention. However, since persons skilled in the art can make various embodiments without departing from the spirit and scope of the invention, the invention is embodied in the claims hereafter appended.

I claim:

1. A composition, having permeability to oxygen and carbon dioxide exchange, potential wettability, mechanical and dimensional stability when fabricated, which comprises a polymer comprising a major portion of styrene or a substituted styrene compound, an effective amount of an ethylenically unsaturated silicone-containing compound sufficient to provide oxygen and carbon dioxide exchange, an effective amount of an ethylenically polyunsaturated crosslinking compound, and an effective amount of an $\alpha, \beta$-ethylenically unsaturated dicarboxylic acid anhydride compound sufficient to provide wettability when hydrolyzed.

2. The composition of claim 1 wherein the substituted styrene compound comprises a compound of the formula:

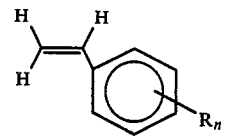

wherein n is an integer of 1–5 and R is a branched chain alkyl group or alkoxy group having 1 to 8 carbon atoms or mixtures of such compounds.

3. The composition of claim 2 wherein the substituted styrene compound comprises 1-vinyl-4-t-butyl benzene, 1-vinyl-3-t-butyl-benzene, 1-vinyl-3-i-propyl-benzene, 1-vinyl-4-i-propyl benzene or mixtures thereof.

4. The composition of claim 2 wherein the substituted styrene compound comprises a 1-vinyl-3-alkoxy-benzene, a 1-vinyl-4-alkoxy-benzene or mixtures thereof.

5. The composition of claim 1 wherein the ethylenically unsaturated silicone containing compound comprises a vinyl trialkyl silane, a vinyl tris($\beta$-alkoxy alkoxy) silane, a $\gamma$-methacryloxypropyltrimethoxy silane or mixtures thereof.

6. The composition of claim 1 wherein the ethylenically unsaturated silicone-containing compound comprises pentamethyl disiloxanyl methacrylate.

7. The composition of claim 5 wherein the ethylenically unsaturated silicone-containing compound is combined with about 0.01 to 2 parts by weight of an alkyl acrylate or an alkyl methacrylate per part of the ethylenically unsaturated silicone containing monomer.

8. The composition of claim 1 wherein the ethylenically polyunsaturated crosslinking compound comprises a compound having at least two vinyl groups bonded to a polyvalent group.

9. The composition of claim 1 wherein the ethylenically polyunsaturated crosslinking agent comprises divinyl benzene, trivinyl benzene, 1,6-hexadiene, divinyl maleate, or mixtures thereof.

10. The composition of claim 8 wherein the ethylenically unsaturated crosslinking compound comprises an ester of a polyhydroxy compound and an unsaturated carboxylic acid compound.

11. The composition of claim 10 wherein the polyhydroxy compound is ethylene glycol, propylene glycol, trimethylol propane, mannitol or mixtures thereof and the unsaturated carboxylic acid is acrylic acid or methacrylic acid.

12. The composition of claim 8 wherein the ethylenically unsaturated crosslinking agent comprises trimethylol propane trimethacrylate.

13. The composition of claim 1 wherein the $\alpha,\beta$-ethylenically unsaturated carboxylic anhydride compound comprises maleic anhydride.

14. The composition of claim 1 wherein the polymer is the product of the reaction of the styrene or substituted styrene compound, the ethylenically unsaturated silicone-containing compound, the polyunsaturated crosslinking compound and $\alpha,\beta$-ethylenically unsaturated dicarboxylic acid anhydride compound in the presence of a catalyst compound that yields free radical polymerization initiators in the presence of ultraviolet light.

15. A lens blank which comprises the composition of claim 1, 3 or 12.

16. The composition of claim 1 wherein there are about 50 to 80 parts by weight of styrene or substituted styrene compound, about 5 to 20 parts of the ethylenically unsaturated crosslinking compound, about 4 to 10 parts of the ethylenically unsaturated silicone-containing compound, and about 4 to 15 parts of the $\alpha,\beta$-ethylenically unsaturated dicarboxylic acid anhydride compound.

17. A contact lens manufactured from a lens blank composition having permeability to oxygen exchange, surface wettability when hydrolyzed, mechanical and dimensional stability when fabricated, which comprises a polymer comprising a major proportion of styrene or a substitute styrene compound, and an effective amount of an ethylenically unsaturated silicone-containing compound sufficient to provide oxygen and carbon dioxide exchange, an effective amount of an ethylenically polyunsaturated crosslinking compound, and an effective amount of an $\alpha,\beta$-ethylenically unsaturated dicarboxylic acid anhydride compound sufficient to provide wettability when hydrolyzed.

18. The contact lens of claim 17 wherein the substituted styrene compound comprises a compound of the formula:

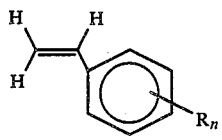

wherein n is an integer of 1–5 and R is a branched chain alkyl group or alkoxy group having 1 to 8 carbon atoms or mixtures of such compounds.

19. The contact lens of claim 18 wherein the substituted styrene compound comprises 1-vinyl-4-t-butyl benzene, 1-vinyl-3-t-butyl-benzene, 1-vinyl-3-i-propyl-benzene, 1-vinyl-4-i-propyl benzene or mixtures thereof.

20. The composition of claim 18 wherein the substituted styrene compound comprises a 1-vinyl-3-alkoxy-benzene, a 1-vinyl-4-alkoxy-benzene or mixtures thereof.

21. The contact lens of claim 17 wherein the ethylenically unsaturated silicone containing compound comprises a vinyl trialkyl silane, a vinyl tris($\beta$-alkoxy alkoxy) silane, or mixtures thereof.

22. The contact lens of claim 21 wherein the ethylenically unsaturated silicone-containing compound comprises pentamethyl disiloxanyl methacrylate.

23. The contact lens of claim 21 wherein the ethylenically unsaturated silicone containing compound is used in combination with about 0.01 to 2 parts by weight of an an alkyl acrylate or an alkyl methacrylate per part of the ethylenically unsaturated silicone containing monomer.

24. The contact lens of claim 17 wherein the ethylenically polyunsaturated crosslinking compound comprises a compound having at least two vinyl groups bonded to a polyvalent group.

25. The contact lens of claim 24 wherein the ethylenically polyunsaturated crosslinking agent comprises divinyl benzene, trivinyl benzene, 1,6-hexadiene, divinyl maleate, or mixtures thereof.

26. The contact lens of claim 24 wherein the ethylenically unsaturated crosslinking compound comprises an ester of a polyhydroxy compound and an unsaturated carboxylic acid compound.

27. The contact lens of claim 26 wherein the polyhydroxy compound is ethylene glycol, propylene glycol, trimethylol propane, mannitol or mixtures thereof and the unsaturated carboxylic acid is acrylic acid or methacrylic acid.

28. The contact lens of claim 24 wherein the ethylenically unsaturated crosslinking agent comprises trimethylol propane trimethacrylate.

29. The contact lens of claim 17 wherein the $\alpha,\beta$-ethylenically unsaturated dicarboxylic anhydride compound comprises maleic anhydride.

30. The contact lens of claim 17 wherein the polymer is the product of the reaction of the styrene or substituted styrene compound, the ethylenically unsaturated silicone-containing compound, the polyunsaturated crosslinking compound and $\alpha,\beta$-ethylenically unsaturated dicarboxylic acid anhydride compound in the presence of a catalyst compound that yields free radical polymerization initiators in the presence of ultraviolet light, or heat.

31. The contact lens of claim 30 wherein after manufacturing the lens blank the contact lens is contacted with a basic aqueous solution to hydrolyze the anhydride groups.

32. The contact lens of claim 17 wherein there is about 50 to 80 parts by weight of styrene or the substituted styrene compound, about 5 to 20 parts of the ethylenically polyunsaturated crosslinking compound, about 4 to 10 parts of the ethylenically unsaturated silicone-containing compound, and about 4 to 15 parts of the $\alpha,\beta$-ethylenically unsaturated dicarboxylic acid anhydride compound.

33. A composite contact lens which comprises a hard center portion comprising the composition of claim 1 and a soft outer skirt comprising a hydrated hydrophilic copolymer.

* * * * *

UNITED STATES PATENT AND TRADEMARK OFFICE
CERTIFICATE OF CORRECTION

PATENT NO. : 4,611,039
DATED : September 9, 1986
INVENTOR(S) : JAMES C. POWELL, G. GRAHAM ALLAN It is certified that error appears in the above-identified patent and that said Letters Patent are hereby corrected as shown below:

Column 3, lines 45-51, for

"
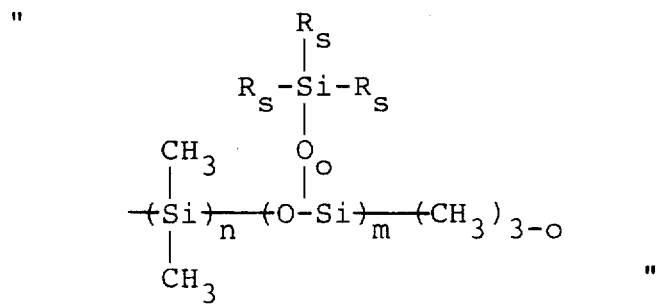
"

read

--
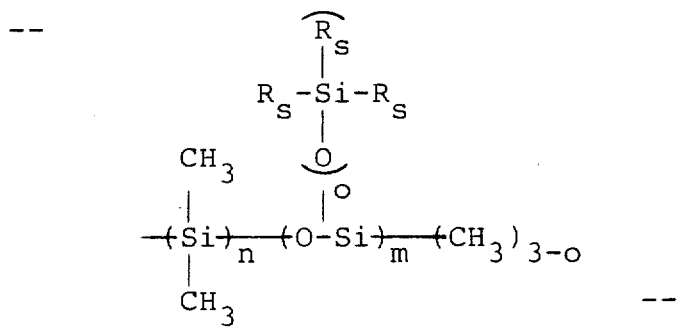
--

UNITED STATES PATENT AND TRADEMARK OFFICE
CERTIFICATE OF CORRECTION

PATENT NO. : 4,611,039
DATED : September 9, 1986
INVENTOR(S) : JAMES C. POWELL, G. GRAHAM ALLAN It is certified that error appears in the above-identified patent and that said Letters Patent is hereby corrected as shown below:

```
Column 7, line 17, for "resuting" read --resulting--.
Column 8, line 54, for "hydroxyethylmethyacrylate" read
     --hydroxyethylmethacrylate--.
Column 9, line 62, for "excedpt" read --except--.
Column 12, line 17, for "an an" read --an--.
```

Signed and Sealed this

Thirtieth Day of December, 1986

*Attest:*

DONALD J. QUIGG

*Attesting Officer*  *Commissioner of Patents and Trademarks*